No. 823,926. PATENTED JUNE 19, 1906.
M. C. CLARK.
MANUFACTURE OF FOOTWEAR.
APPLICATION FILED MAR. 29, 1905.

Witnesses
Raphaël Netter
R. B. Cavanagh

Inventor
Maurice C. Clark
By his Attorneys

No. 823,926. PATENTED JUNE 19, 1906.
M. C. CLARK.
MANUFACTURE OF FOOTWEAR.
APPLICATION FILED MAR. 29, 1905.

Witnesses
Raphaël Netter
R. B. Cavanagh

Inventor
Maurice C. Clark
By his Attorneys
Clifford & Price

No. 823,926. PATENTED JUNE 19, 1906.
M. C. CLARK.
MANUFACTURE OF FOOTWEAR.
APPLICATION FILED MAR. 29, 1905.

UNITED STATES PATENT OFFICE.

MAURICE C. CLARK, OF PROVIDENCE, RHODE ISLAND, ASSIGNOR TO MARVEL RUBBER COMPANY, A CORPORATION OF RHODE ISLAND.

MANUFACTURE OF FOOTWEAR.

No. 823,926.      Specification of Letters Patent.      Patented June 19, 1906.

Application filed March 29, 1905. Serial No. 252,666.

*To all whom it may concern:*

Be it known that I, MAURICE C. CLARK, a citizen of the United States, and a resident of Providence, county of Providence, and State of Rhode Island, have invented a certain new and useful Improvement in the Manufacture of Footwear, of which the following is a specification.

In the accompanying drawings.

1 is a last conforming to the ordinary rubber overshoe. 2 and 3 are the side-mold parts, and 4 is the sole-mold part, of a conformation adapted to mold the exterior of such shoe. 5 and 6 are the steam-chambers for imparting vulcanizing heat to said side-mold parts, and 7 is a steam-chamber for said sole-mold part. These steam-chambers are provided with the necessary steam-fittings for the circulation of steam and which may be of any suitable construction and are not shown.

The side-mold parts 2 and 3 and their steam-chambers 5 and 6 are supported and operated as follows: The base-plate 7$^a$ of the frame is provided with the side uprights 8 and 9. 10 and 11 are a pair of bars slidably mounted in said frame-uprights and extending longitudinally from end to end of the machine. The side-mold part 2 and its steam-chest 5 are rigidly fixed across the front ends of said pair of bars by the nuts 12 and 13. The side mold 3 and its steam-chest 6 are slidably mounted upon said pair of bars by being provided at opposite ends with the lugs 14, bearing upon said bars above and below. The rear ends of said pair of bars are screw-threaded and carry the cross-head 15, which is held adjustably at each end between the pair of nuts 16 16 on one bar and the pair of nuts 17 17 on the other bar. 18 is a pillar erected upon the frame-base 7$^a$ and in which is journaled the rocker having the arms 19 20. The rocker-arm 20 is connected by the link 21 with the cross-head 15 and the rocker 19 by the link 22 with the steam-chamber 6 of the side mold 3. 23 is a third arm of the rocker, to which power is applied.

It will now be seen that the two arms of the rocker and their coöperating links constitute two toggle-joints operating in opposite directions from the fixed bearing 18. The thrust of one of these toggle-joints is delivered directly against the back of the side mold 3 and its steam-chest 6. The thrust of the other of the toggle-joints is delivered to the side mold 2 and its steam-chest 5 indirectly through the cross-head 15 and the two side bars 10 and 11. Thus the operation of the rocker member 20 causes the two side molds and their steam-chests to reciprocate inversely toward and from the last in unison. Their relative position may be adjusted by means of adjusting the cross-head 15 upon the two rods by means of the pairs of nuts 16 16 and 17 17.

Figure 1:
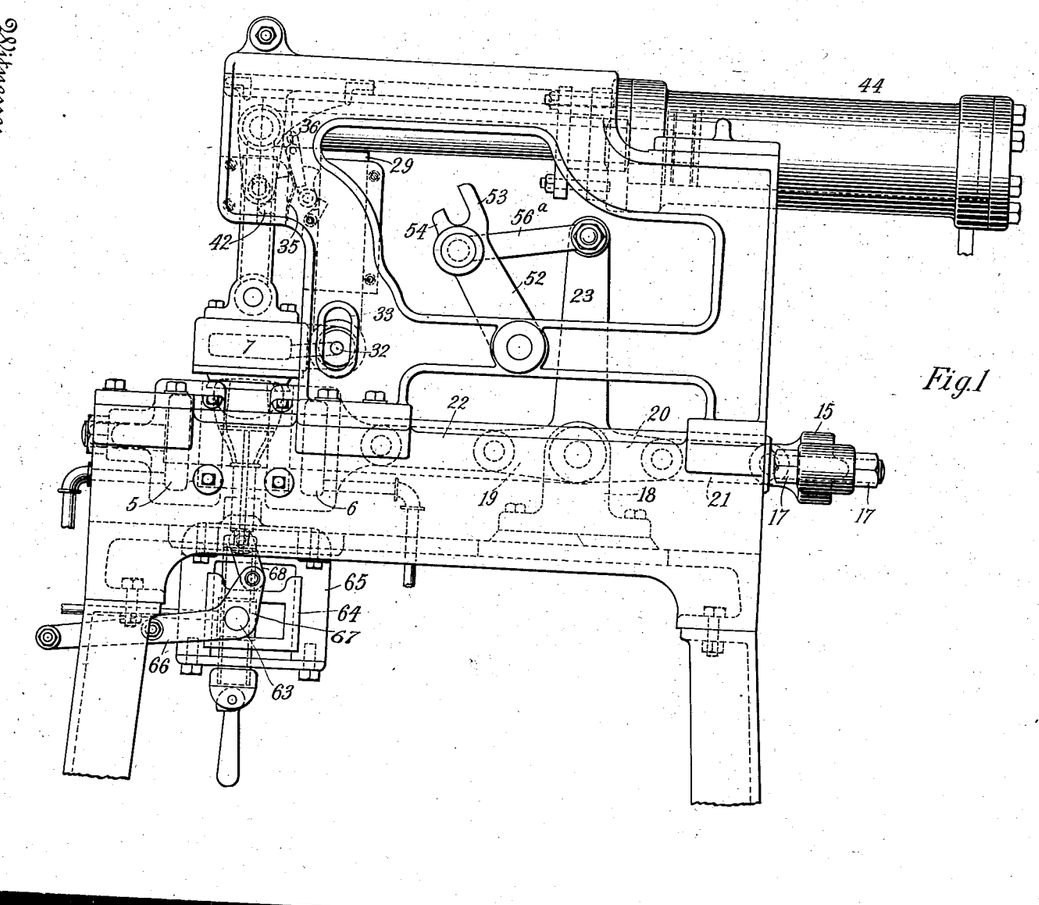
Figure 1 is a side elevation of a machine embodying my invention.
Figure 2:
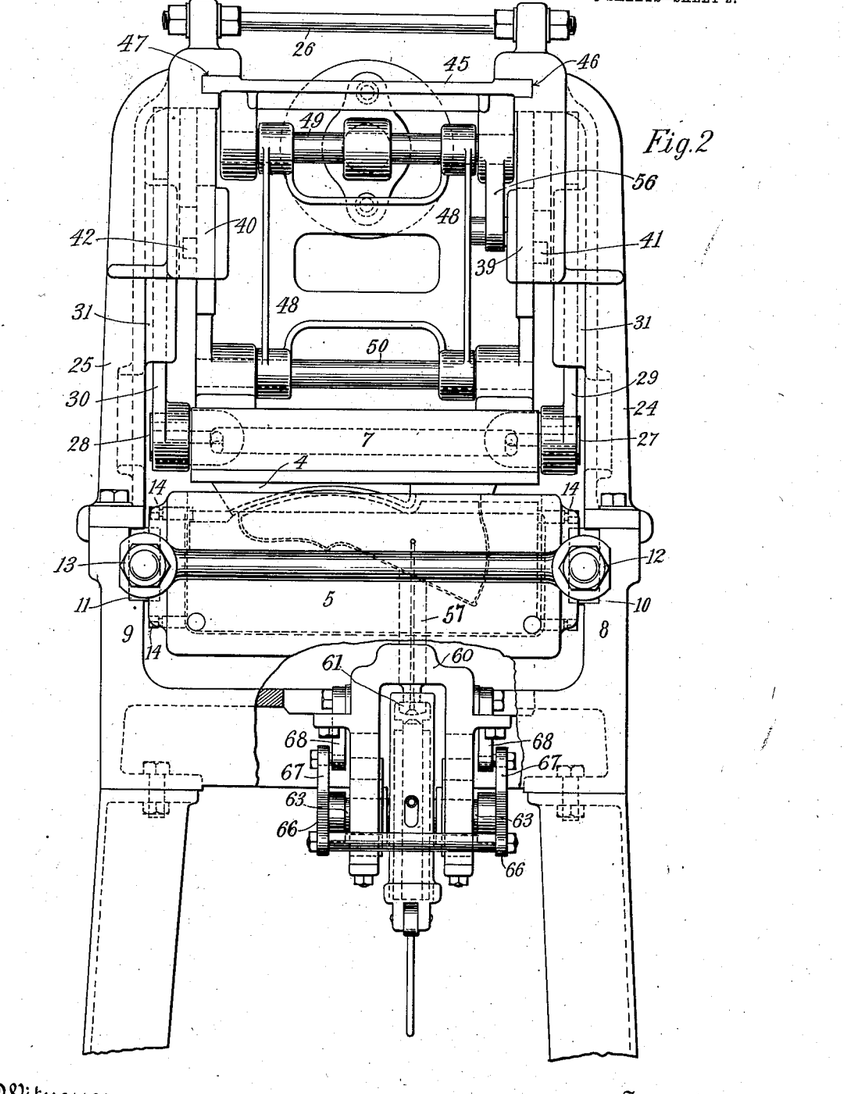
Fig. 2 is a front elevation of the same.
Figure 3:
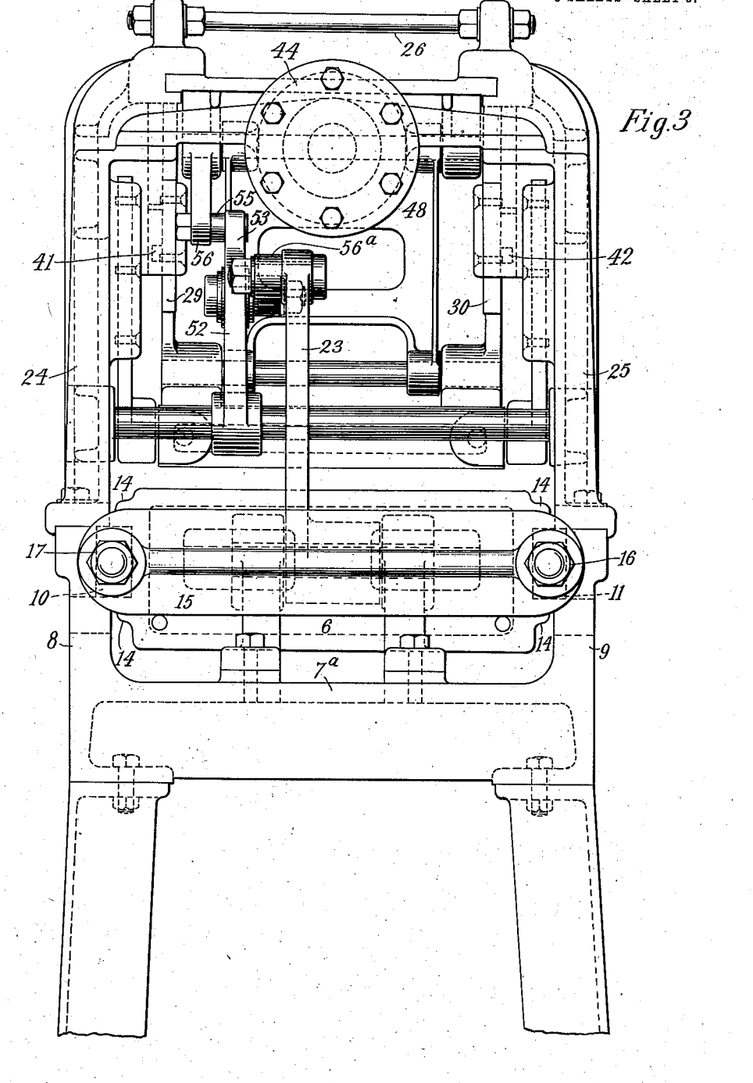
Fig. 3 is a rear elevation of the same.

The sole-mold 4 and its steam-chamber 7 are supported and guided as follows: On top of the uprights 8 and 9 of the mold-frame is mounted a supplemental frame consisting of the side uprights 24 25, connected by the stretcher-bolt 26. 27 and 28 are trunnions cast or otherwise secured to the back of the steam-chest 7, which trunnions have their bearings in hangers 29 and 30, mounted to slide vertically between lugs 31, cast on the inside of the supplemental frame members 24 and 25. 32 is a steam-pipe extending through the slot 33 in the frame to enter the end of the trunnion for the supply of steam to the steam-chest 7. 34 is a pawl engaging with a notch in the slide 30, into which notch it is pressed by the spring 35. The free end of this pawl is provided with a pin 36. There are two of these pawls, one for the slide 29, as well as one for the slide 30. 37 and 38 are the members of a vertical guideway supported by the supplemental frame in substantial alinement with the center of the last. 39 and 40 are two arms fixed to the top of the steam-chest 7, so as to extend therefrom vertically upward when the mold part 4 is in pressing position, as shown in Fig. 1. Upon the outside of these arms, respectively, are lugs 41 and 42, which coöperate with the guideways 37 38 in such manner as to compel the first movement of the mold part 4 to be in a vertical line. The guide members 37 are, however, cut away, so as to leave the opening 43, permitting the lugs 41 and 42 to leave said guideways after having ascended therein a short distance, and thus to permit the steam-chest 7 and mold part 4 to be turned upwardly and rearwardly upon the trunnions.

Figures 4, 5, 8:
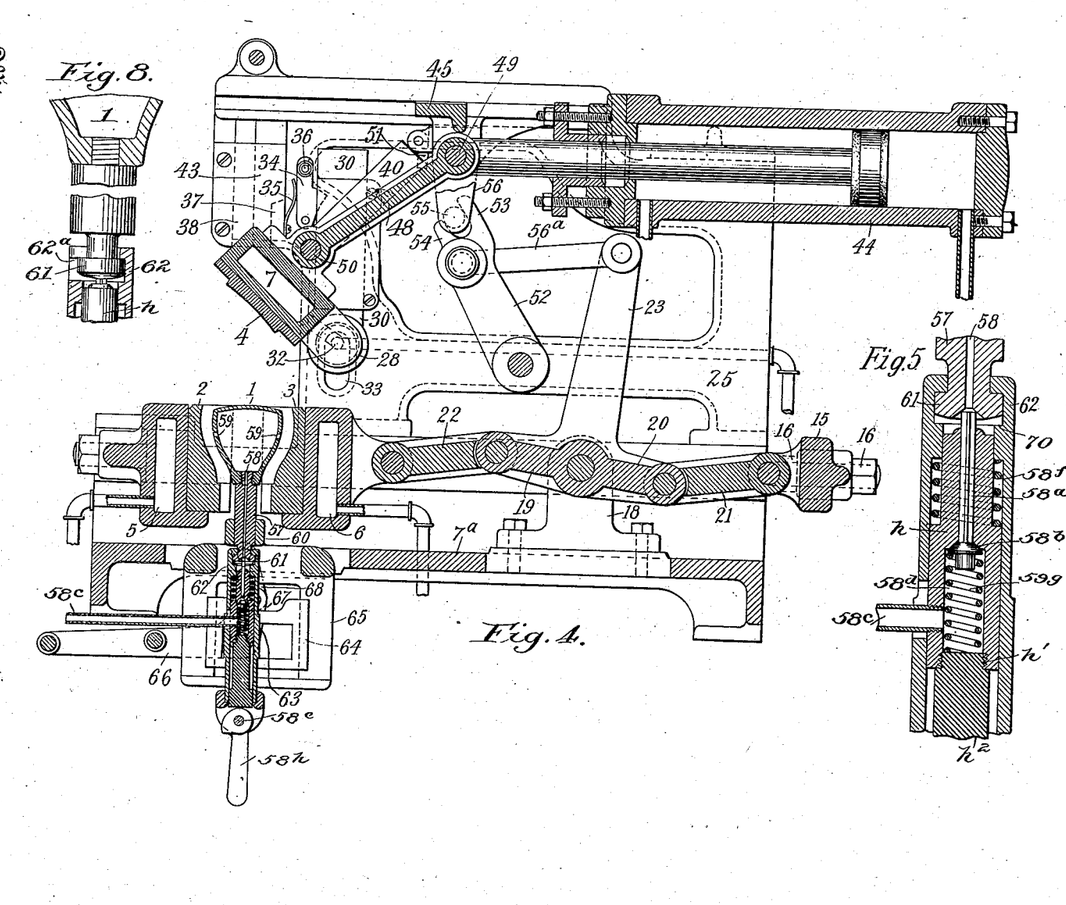
Fig. 4 is a longitudinal section through the steam-chambers and the apparatus by which the molds are opened and closed, showing the parts opened.
Fig. 5 is a vertical longitudinal sectional view of a portion of the last-supporting stud.
Fig. 8 is a detail view, partly in elevation and partly in section, of the last-support shown in Fig. 5, such view illustrating the manner of connecting the head 61 with the sleeve 62.

The sole-mold part 4 and its steam-chest 7 are actuated as follows: 44 is a double-acting hydraulic motor mounted upon the supplemental frame, the cross-head 45 of which slides horizontally in guideways 46 and 47 on the supplemental frame. This cross-head is connected with the top of the steam-chest 7 by the links 48, pivoted to the cross-head by the shaft 49 and to the steam-chest by the shaft 50. When now the mold part 4 is in the pressing position, (shown in Fig. 1,) the first effect of the reversal of the hydraulic motor 44 will be to raise it vertically upward by reason of the engagement of the lugs 41 and 42 with the guideway members 37 and 38; but the second effect upon reaching the top of the guideway 37 will be to swing it upon its trunnions into a vertical position. In Fig. 4 it is shown in the act of being so swung and in about midway position. During the first or upward motion the slides 29 and 30 will be drawn upward until the pawls 34 engage with their notches, and they remain in such engagement during the swinging movement, so as to support said slides and the trunnions suspended thereby. Upon the return movement of the hydraulic motor these slides and trunnions are held in their elevated position by said pawls until the end of the return swinging movement is nearly reached, whereupon the pawls will be knocked out of engagement with their notches by the collision of the lugs 51 with the pins 36 on said pawls. This disengagement of the pawls is so timed that the descent of the slides 29 and 30 will not occur until after the lugs 41 and 42 have passed into the guideways 37 38, ready for the vertical motion which returns the mold to pressing position. The lugs 51 are pivotally secured to the cross-head 45 and held normally in the position shown in Fig. 4 by a suitable spring, (not shown,) so that in the opening of the mold they can yield so as to pass by the pins 36 on the pawls.

The toggles for operating the side molds may be actuated as follows: 52 is a rocking arm pivoted to the supplemental frame and carrying at its free end a fork, one branch of which, 53, is longer than the other branch 54. Engaging with this fork is a pin 55, fixed to a hanger 56 from the cross-head 45. The rocking arm 52 is connected with the long rocker arm 23 by the link 56ᵃ. Thus whenever the motor 44 raises the mold part 4 it will, through the connections last described, cause the toggle mechanism to open the side molds 2 and 3 in unison therewith, and vice versa, on closing.

I will next describe the movement imparted to the last 1. Heretofore in the endeavor to manufacture molded footwear an obstacle to success has been the tendency of those mold parts whereby the upper of the boot or shoe was formed (which I will refer to as the "upper-forming" mold parts and which in the form shown in the accompanying drawings are designated as 2 and 3) in closing to gather between them a wrinkle of the upper inclusive of the rubber and lining, and thus destroy the product for commercial purposes. I propose to overcome this difficulty by holding back those portions of the last-surface which support the upper adjacent to the line of separation between the upper-forming mold parts until the closing of the upper-forming mold parts is substantially completed (or, in other words, so far completed as not to gather the upper between them) and then to advance said last-surface portions into final molding position by a last-surface-locating means which may be of the form hereinafter described or of any other suitable form. The last-surface-locating means which I am about to describe locates the whole of the last-surface, inclusive of the surface lasting the sole, as well as the surface lasting the upper; but for the purpose of that part of my invention to which reference is now being made the part of the last-surface of which the movement is essential is the upper-lasting part, and particularly those portions thereof that last the upper adjacent to the line of division between the upper-forming mold parts wherever said line of division may be located.

Referring particularly to Figs. 5 and 8, it will be noted that 57 is a vertical stud containing the longitudinal perforation 58, and upon the upper end of which stud is screwed the last 1, consisting of a shell of cast metal containing the side perforations 59 to permit the outflow of air from the interior to the exterior of the last. The stud 57 is mounted to reciprocate in a vertical bearing 60 and at its lower end is provided with a head 61. 62 is a tubular sleeve the upper end of which is slotted, as at 62ᵃ, to admit of the head 61 being inserted laterally therein, so that the passage-way 58 may aline with the air-channel 58ᵃ, in which lies the fluted stem of the air-valve 58ᵇ. The air-channel 58ᵃ and the valve 58ᵇ lie within the housing $h$, which is connected at $h'$ to the movable post $h^2$. The valve 58ᵇ is tensioned by the spring 59ᵉ, while the housing $h$, movable with the post $h^2$, is tensioned by the spring 58ᶠ. Air is admitted from any suitable source under pressure to the air-pipe 58ᶜ, which leads into the chamber 58ᵈ. The air-valve 58ᵇ controls commu nication between the chamber 58$^d$ and the channel 58$^a$. When it is desired to permit air to flow into the hollow last, the hand-lever 58$^h$, carrying the cam 58$^e$ is operated, which cam bearing against the bottom of the sliding post $h^2$ forces the latter upward against the tension of the spring 58$^b$ until the top of the housing abuts against the head 61, when, of course, owing to the upward movement of the housing $h$ away from the head of the valve 58$^b$, communication will be established between the air-line 58$^c$ and the interior of the last. When the lever 58$^h$ is moved to its normally inoperative position, (shown in Fig. 4,) the toe of the cam being moved away from the base of the post $h^2$ of the housing will permit the parts to assume the position shown in Fig. 5, the head of the valve 58$^b$ closing communication between the parts. The tubular sleeve 62 is also provided with side lugs 63, mounted to slide longitudinally in the carriages 64, which slide vertically in the hanger 65 from the main frame. A hand bell-crank lever containing the arms 66 and 67 is fulcrumed at the end of its short arm to the links 68, pivoted to the main frame. Said slide 63 is pivotally secured to said hand-lever, so as to be raised and lowered thereby. Thus by the movement of the hand-lever 66 the slide 63 and the stud 57 will be reciprocated vertically, forming means whereby the last may be raised and lowered.

The operation of the whole machine will be as follows: Supposing the molds to be entirely opened, the operator takes a shoe which is upon the last 1, carrying the stud 57, and operates the lever 58$^h$ so as to operate the air-valve in the manner hereinbefore described to permit air to flow from a suitable source (not shown) through the pipe 58$^c$ into the hollow last. The shoe in this position is held a very short distance above the position to be occupied during vulcanization, and when the top or sole mold bears down upon the last 1 it will have a tendency to force the head 61 slightly downward toward the shelf 70. As heretofore mentioned, the molds are operated by the motor 44. The hydraulic motor 44 is started to close the molds, and its operation will be to close the side molds before it completely closes the sole-mold 4. As soon as the operator sees that the side molds are closed and before the sole-mold is completely closed he will pull the lever 66 toward him, so as to very quickly engage the slide 67 with the head of stud 57. He will then immediately by a downward movement of the lever 66 depress the last and its shoe between the side molds to its final position. By this depression the material of the shoe between the sides of the last and the side mold is strongly compressed. The converging form of the last and the side molds by which this compression is produced extends all the way down to the border or mar-gin of the inverted shoe, so that, if desired, the form of the margin of the shoe may be molded by this pressure. The movements by which the operator is enabled to depress the shoe into its final position are such that it can be done almost instantaneously, as is necessary in order to enable it to be done after the side molds are in position for pressing and while the sole-mold is arriving at its final position. After the operator has thus depressed the last to its final position the hydraulic motor will continue its closing operation until the sole-mold 4 is brought into pressing position. Thereupon the parts will remain in pressing position until the vulcanization is complete.

Figures 6, 7:
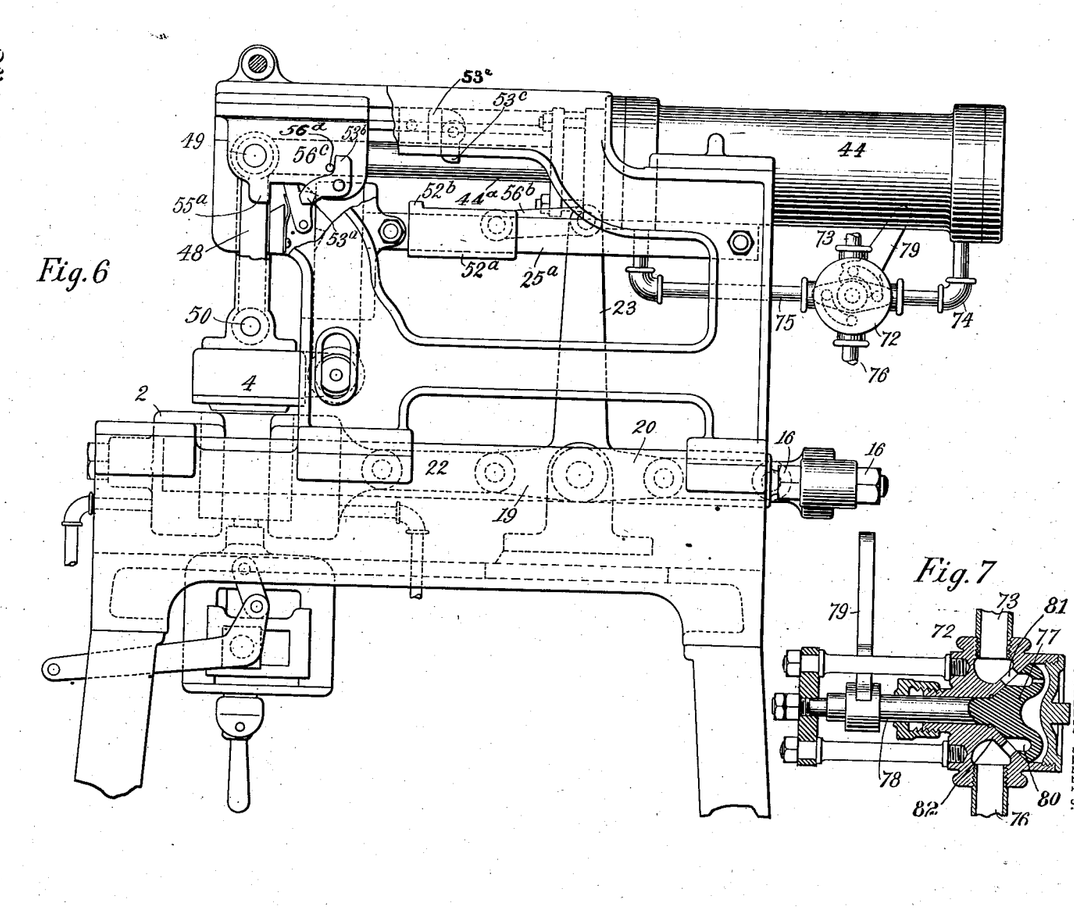
Fig. 6 is a view in side elevation of a modified form of my invention.
Fig. 7 is a detail sectional view of a form of valve used in connection with the hydraulic motor.

In Fig. 6 I have shown another form of my invention differing from the machine just described, principally with regard to the manner of operating the toggles of the side molds and the top mold. In the construction shown in Fig. 6, 25$^a$ designates a bar upon which is mounted to slide the sleeve-block 52$^a$, having a small lug 52$^b$ projecting upward therefrom. Operatively connecting this sleeve-block with the arm 23 is a link 56$^b$. Carried by the outer end of the piston 44$^a$ of the hydraulic motor is a cross-head 56$^c$, designed to slide with the movement of such piston and connected to the top of the steam-chest 7 by the before-mentioned link 48. This cross-head is provided with a rigid lug 55$^a$ and a pivoted dog 53$^b$. 56$^d$ is a stop-pin to limit the forward movement of the upper end of the dog, and 53$^c$ is a projection pivoted to the side of one of the guideways of the cross-head and depending downward in the path of movement of the double dog 53$^b$. The projection 53$^c$ is prevented from swinging forward toward the front of the machine by the stop 53$^e$.

The operation of this construction is as follows: In the position shown in Fig. 6 the piston has completed its forward movement and the top mold 4 is pressing against the sole of the article. Now if the parts are to be retracted to the position shown in Fig. 4 air is admitted to the front end of the piston through pipe 75 and the mold 4 is drawn vertically upward, being maintained in a vertical pathway by the guides heretofore described. When the lugs leave the guides 37 and the piston is in its retractive movement, the cross-head will be drawn backward. The end 53$^a$ of the dog striking the lug 52$^b$ on the sleeve-block and yielding will pass the same; but the lug 55$^a$ will engage with the lug 52$^b$ and pulling the same along the bar 25$^a$ will rock the arm 23 toward the rear of the machine, and consequently cause the side molds to move in opposite directions away from each other in the manner heretofore described until the piston has reached the limit of its rearward movement and the mold 4 is elevated. Now in the downward travel of the top mold and the closing in of the side molds the action is as follows: The sleeve-block is in position near the rear of the bar 25ª, and its lug 52ᵇ is engaged by the toe 53ª of the dog, which carries it forward until the projection 53ᶜ trips the dog and disengages it from the sleeve-block, the side molds at this point having closed in on the shoe. The piston continues its forward movement to the end of its throw, and the mold 4 is brought into contact with the sole of the shoe a short time after the side molds. To actuate the piston of the motor by conveying hydraulic pressure to and from the cylinder, I employ the following preferred construction: 72 is a four-way valve having four connecting-pipes 73, 74, 75, and 76, the pipes 74 and 75 leading into the rear and front ends, respectively. 79 is a lever connected to the stem 78 of the conical valve-head 77, which latter is formed with segmental channels 80, adapted to aline with the various openings 81, formed in the conical valve-seat 82. By turning the stem by means of the lever the pressure may be admitted through the intake-pipe 73 to the valve and from thence to either side of the piston, it being understood that as it is admitted to one side of the piston it is exhausted from the other and escapes through the valve and out of the exhaust-pipe 76. It will of course be understood that any type of valve may be employed and any means for operating such valves at the proper time may also be used.

What I claim is—

1. The combination of a last, side molds, a top mold, and actuating means for said molds adapted to bring the side molds into contact with a shoe on the last at a relatively earlier time than the top mold.

2. The combination of a last, and a plurality of mold members, certain of which are movable into contact with a shoe on the last prior to certain other of the mold members.

3. The combination of a shoe-support, a plurality of oppositely-moving side molds, a top mold, means for actuating said top mold in driving or operating connection therewith, and power-transmitting means between the top mold and the side mold and operated by the movement of the means for actuating the top mold.

4. The combination of a shoe-support, a plurality of molds arranged adjacent to the support, and means for bringing certain of said molds into contact with the shoe on the support prior to certain other of the molds.

5. The combination with a last, a top or sole mold and side molds, means connected directly with and actuating the top mold, and power-transmitting means between the top mold and the side molds.

6. The combination of a last, a top or sole mold and side molds, a motor in direct driving engagement with the top mold for actuating the latter and a rocking power-transmitter between the top mold and the side molds, whereby the side molds are actuated from the motor driving the top mold.

7. The combination of a shoe-support, a mold therefor, mechanism for actuating said mold, means for directing the movement of said mold in approximately vertical plane a portion of its distance, and means for permitting said mold to rock or swing from said vertical plane.

8. The combination of a shoe-support, a mold, a motor for actuating said mold, means for directing said mold in its movement in an approximately vertical plane for a portion of the distance, and means for causing said mold to rock or swing from said vertical plane.

9. In combination with a shoe-molding machine of a top or sole mold therefor, a motor, a movable connection between said motor and the mold, and means for rocking said mold at the point where it is secured to the connection.

10. In combination with a shoe-molding machine, a top mold, a side mold, a motor, a connection between said motor and the top mold, and power transmitting mechanism interposed between the motor and the side mold, and adapted to be actuated by the movement of the motor to impart a reciprocating movement to said side mold.

11. The combination with a shoe-support, of a plurality of side molds, a motor, a top mold actuated directly by said motor and a rocking connection interposed between the motor and the side molds and adapted to be actuated by the movement of the motor for imparting a reciprocating motion to each of said molds to move the same toward and from each other.

12. The combination with a shoe-molding machine of an adjustable shoe-support, a top mold, a plurality of side molds, one arranged at each side of the shoe-support, a motor, a connection between the motor and the top mold, and mechanism movably mounted on the frame of the machine adapted to receive motion from the movement of the motor for moving the side molds toward and from each other.

13. The combination with a shoe-molding machine, of a shoe-support, a plurality of oppositely-disposed sliding side molds, a vertically-movable top mold, a hydraulic motor connected to said top mold for operating the same, and power-transmitting mechanism including a rocker-arm interposed between the motor and the side molds for transmitting movement to said side molds from the motor, whereby the side molds are closed at a relatively earlier period than the top mold.

14. The combination of a shoe-support, a top mold and side molds, a motor connected to and actuating said top mold, a rocking arm, and connections between said rocking arm and the side molds and between said rocking arm and the motor, for transmitting motion to said side molds simultaneously with the movement of the top mold.

15. The combination of a shoe-support, mechanism for moving said support vertically, means for shifting the support laterally, and a plurality of molds arranged adjacent to said support and adapted to be closed about said support.

16. The combination of an adjustable shoe-support, heated pressure-producing devices adapted to bear against a shoe upon the support, and means for moving certain of said devices into contact with said shoe at relatively different times.

17. The combination of a shoe-support, heated pressure-producing devices adapted to bear against a shoe upon the support, means for moving one of said devices in an approximately vertical path and then rocking such device out of said vertical path, and means for causing certain other of the devices to move toward and from the shoe in an approximately horizontal plane.

18. The combination of an adjustable shoe-support, heated pressure-producing devices adapted to bear against a shoe upon said support, means for moving certain of said devices toward and from each other and toward and from the shoe, and means for elevating and rocking certain other of the devices.

19. The combination of a shoe-support, a plurality of oppositely-moving molds, a motor, a rocking sole-mold actuated by said motor, a toggle mechanism, and means for transmitting power from the motor through the toggle mechanism to actuate said oppositely-moving rolls.

20. The combination of a shoe-support, a plurality of molds adapted to be moved toward and from said shoe-support, a rocker-arm, a connection between said rocker-arm and said molds, a motor, a rocking sole-mold connected to the motor, and means for imparting motion from the motor to the toggle-arm and thence through the connections to said molds.

21. The combination of a shoe-support, a plurality of sliding side molds, a rocking sole or top mold, a motor, a connection between the motor and top mold for actuating the latter, toggle mechanism connected to the side molds, and means for imparting motion from the motor through the toggle connection to the side molds to actuate the latter.

22. The combination of a shoe-support, a plurality of side molds, a top mold, a hydraulic motor connected to the top mold, means for transmitting motion from said motor to the side molds to move the latter in opposite directions, means for introducing an operating fluid to the motor, and a valve for controlling said fluid-introducing means.

23. The combination of a shoe-support, a plurality of hollow side molds adapted to be heated, a top mold also adapted to be heated, a hydraulic motor having a piston connected to the top mold, toggle mechanism interposed between the motor and connected to the side molds, means actuated by the movement of the piston for imparting motion to the toggle mechanism to move said side molds, and means for introducing an operating fluid to the motor.

24. The combination of a vertically and laterally adjustable shoe-support, a top mold, a motor comprising a casing and a piston moving therein, means for introducing an operating fluid to the motor, a link connection between the piston and the mold, means for guiding said mold in a vertical path in its movement, and means for swinging said mold out of said vertical path, at a certain period of its movement.

25. The combination with a shoe-molding machine, of a hollow shoe-support, adapted to have a pressure fluid introduced thereto, means for controlling the admission of the pressure fluid to and from the support, means for moving said support vertically, and means for shifting said support laterally.

26. The combination with a shoe-molding machine, of a hollow shoe-support adapted to have a pressure fluid introduced thereto, valve mechanism for controlling the introduction of such fluid-pressure, a sliding frame for moving said support vertically, and means for shifting said support laterally.

27. The combination of a shoe-support, a plurality of pressure-producing devices adapted to be moved into and out of contact with a shoe upon said support, a hydraulic motor comprising a cylinder and a piston moving therein, a connection between one of said pressure-producing devices and the piston, and means for introducing an operating fluid to the cylinder comprising a valve-chamber, a supply-pipe leading into said chamber, induction-pipes leading from said chamber to opposite ends of the cylinder, an exhaust-pipe leading from said valve-chamber, and a four-way valve within the chamber.

28. The combination of a hollow, adjustable shoe-support, a plurality of molds each provided with a heating-chamber, a hydraulic motor for actuating all of said molds, and means for bringing certain of said molds into contact with a shoe upon the support at relatively earlier times than certain other of said molds.

29. In a shoe-molding machine the combination of a shoe-support, and a rocking sole-mold adapted to be moved into and out of contact with the shoe on the support.

30. In a machine for molding footwear, in combination, a plurality of upper-forming mold parts, an upper-forming last-surface and means whereby those portions of said last-surface lasting the upper adjacent to the line of division between said mold parts are advanced after the substantial closing of said mold parts.

31. In a machine for molding footwear, in combination, a plurality of upper-forming mold parts, an upper-forming last-surface complemental thereto, a rest whereby said last-surface is supported to withhold the upper from the line of separation between said mold parts while the same are closing, means for closing said mold parts and a last-surface-locating means whereby those portions of the last-surface adjacent to the line of division between said mold parts are advanced.

32. The combination with a frame and a shoe-last, of a plurality of molds, means for closing certain of said molds about a shoe on the last at a relatively earlier period than certain other of the molds, and means for checking the movement of the molds first closed while the movement of the mold member last in closing is continued.

33. The combination with a rigid last-surface, of a plurality of oppositely-moving mold members, means for bringing said mold members to a stationary, closed position adjacent to the last, and means acting upon the last for advancing the same to its final position within the closed mold members.

34. In a machine of the class described the combination with the frame and a shoe-support thereon, of a sole-mold, and means for imparting movement to the sole-mold, such means comprising a sliding member, and means connected to the sole-mold and actuated by the sliding member.

35. The combination with the frame and the shoe-support thereon, a motor, a sole-mold, a member connected to the sole-mold and actuated by the motor, a second member arranged adjacent to the first member, and connected to the side molds, and means for transmitting power from the first to the second member whereby all of said molds may be actuated.

36. The combination with the frame and the work-support thereon, of side molds and the sole-mold, a motor, power-transmission means between the motor and all of the molds whereby said molds may be operated from the motor, and means for checking the movement of the side molds and permitting the continuation of movement of the sole-mold after the movement of the side molds has ceased.

37. The combination with the frame and the work-support thereon, of side molds and a sole-mold, means for actuating all of said molds simultaneously, and means for checking the movement of the side molds while the movement of the sole-mold continues.

38. In combination, rigid mold parts, a rigid last-surface part, means whereby the mold parts are advanced, means whereby a portion of the surface of the last opposed to said mold parts is held back from final position during the closing of the mold parts, and means whereby said portion of the last-surface is given its final advance toward said mold parts after the closing of the mold parts.

39. The combination with the side molds, of a rigid-surface shoe-support held out of final position when the side molds are closed, and means for moving the support into final position toward the side molds.

40. The combination with a mold member, of a rigid shoe-support held out of contact with the mold member when the latter is stationary and in its closed position, and means for advancing the shoe-support into contact and into final position relative to the mold member.

41. The combination with the side molds, of a last composed of inflexible material interposed between the same and held out of final molding position when the side molds are closed, and means for applying pressure to the last to advance the same toward and into final molding position relative to the closed molds.

In testimony whereof I have signed my name to this specification in the presence of two subscribing witnesses.

MAURICE C. CLARK.

Witnesses:
RICHARD B. CAVANAGH,
CHAS. J. RATHJEN.